United States Patent [19]

Haug

[11] 4,230,428
[45] Oct. 28, 1980

[54] MATERIAL SAVING CUTTER BLADE

[75] Inventor: Edward W. Haug, Rockford, Ill.

[73] Assignee: Barber-Colman Company, Rockford, Ill.

[21] Appl. No.: 49,851

[22] Filed: Jun. 18, 1979

Related U.S. Application Data

[63] Continuation of Ser. No. 790,779, Apr. 25, 1977, abandoned.

[51] Int. Cl.³ .................... B26D 1/00; B26D 1/12
[52] U.S. Cl. .................... 407/116; 407/25; 407/48; 407/119; 407/61
[58] Field of Search .......... 407/25, 28, 33, 64, 407/103, 61, 62, 48, 113, 114, 116, 119, 120; 75/126 C; 144/218

[56] References Cited

U.S. PATENT DOCUMENTS

| | | | |
|---|---|---|---|
| 1,361,305 | 12/1920 | Buck | 144/218 |
| 1,902,513 | 3/1933 | Meutsh | 407/33 |
| 2,202,407 | 5/1940 | Sykes | 407/28 |
| 2,645,003 | 7/1953 | Thompson et al. | 407/62 |
| 4,032,302 | 6/1977 | Nakamura | 75/126 L |

FOREIGN PATENT DOCUMENTS 386505 12/1923 Fed. Rep. of Germany .............. 29/95
278611 10/1927 United Kingdom ....................... 29/95

OTHER PUBLICATIONS

Article-HIP Offers Both Quality & Economy-from Iron Age Magazine Jul. 21, 1975, pp. 41 & 42.

*Primary Examiner*—Harrison L. Hinson
*Attorney, Agent, or Firm*—Robert M. Hammes, Jr.

[57] ABSTRACT

A cutter blade for use in cutting metal is formed with a recess spaced behind the cutting edge on the cutting face to save expensive cutting material, to reduce the time and energy required to sharpen the cutter blade, and to lengthen the life of the sharpening tool. High density sintered powdered tool steel lends itself well to this construction, as do cast and forged tool steels.

6 Claims, 4 Drawing Figures

MATERIAL SAVING CUTTER BLADE

This is a continuation of application Ser. No. 790,779 filed Apr. 25, 1977, now abandoned.

BACKGROUND OF THE INVENTION

This invention relates to metal working amd more specifically to the construction of cutting tools such as those producing desired shapes from blanks by removing chips or curls by movement of a cutting face substantially perpendicularly across the blank. For convenience these tools will hereinafter be referred to as chip removing cutters.

Chip removing cutters comprise lathe tools, shaper cutters, shaving dies, saws, milling cutters, hobs and the like. They are distinguished from knives, line dies, shears, punches, punch and die block combinations, and the like, that do not ordinarily remove chips or curls to produce a desired shape.

Gear shaper cutters have been made with relatively thin webs supporting a thicker annular rim, the outside of which is ground to the contour required to produce a desired gear or other shape while one end of the rim acts as the cutting face. The inside of the rim has been cylindrical. Such construction resulted in a limited saving of material.

Metal cutting blades are usually made of solid tool steel, cemented carbide, or other extremely hard materials suitable for such use. These cutting materials are relatively difficult to shape and are quite expensive. Cemented carbides are very brittle, making necessary a back-up support by a more resilient material. For these reasons, it has become common to make cutting blades of cutting material and to affix them permanently or separably to less expensive materials comprising a major portion of the cutting tool. Tool steels have been available in solid bars and plates, while cemented carbides have been available in relatively small flat pieces. The tool steel or cemented carbide raw stock has been cut and/or ground to the desired cutting tool shape with the production of substantial quantities of waste. With the recent introduction of suitable powdered metallurgy techniques, it has become possible to obtain roughly formed blades of high density sintered powdered tool steels that are equivalent or superior in properties to the same material in wrought form. This resulted in a substantial reduction in the cost of raw material, even though the sintered material cost more per unit of weight. It also greatly reduced the time and energy required to finish the blade, resulting in a further cost reduction for labor, machine time and energy. The reduction in machine time further resulted in more blades being produced before the production tool required sharpening or dressing. Cemented carbide pieces have been produced with countersinks for heads of fastening screws and the like.

Abbott in U.S. Pat. No. 1,286,194, issued on Dec. 3, 1918 disclosed bail-shaped metal strip supported at each end on a rotatable body and bent to cut a desired shape in plaster, terra cotta, cement or clay. The strip was unsupported between its ends and would not be sufficiently rigid to cut most solid metals.

Further reductions in cost are desirable.

SUMMARY OF THE INVENTION

The present invention is directed toward a further reduction in the production cost of chip removing cutters, such as lathe tools, shaper cutters, shaving dies, milling cutters, hobs and the like, by eliminating unnecessary cutting materials spaced from the cutting edges thereof, leaving sufficient material to rigidly support the cutting edge. This not only reduces material cost, but effects further cost reductions by reducing the time and energy required to sharpen the cutting face, thus reducing labor and machine costs and producing more sharpenings between dressings of the grinding wheel.

The drawings are intended for illustration of the invention only and are not to be scaled. The shapes shown are arbitrary.

Figure 3:
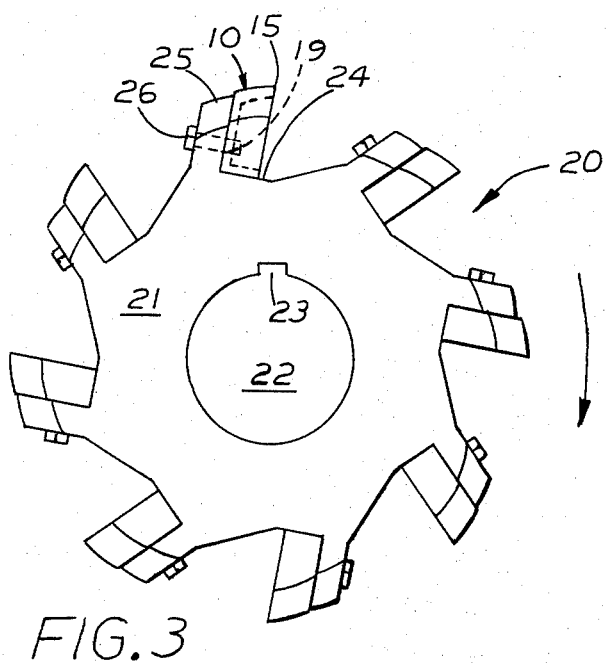
FIG. 3 is an end view of a hob, or milling cutter incorporating blades as shown in FIGS. 1 and 2.
Figure 1:
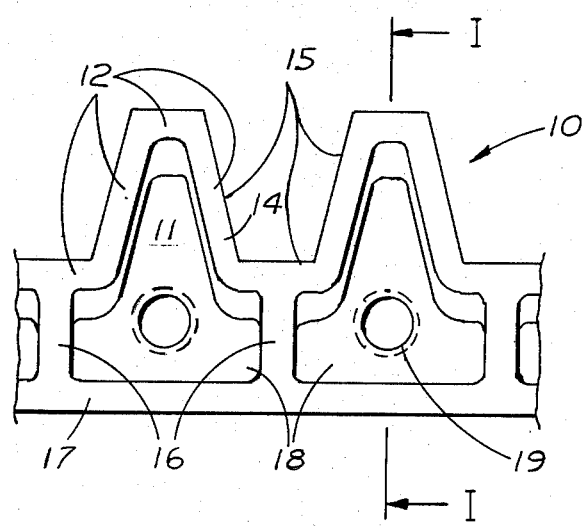
FIG. 1 is a fragmentary front elevation of an insertable cutter blade, said blade made according to the teachings of this invention.
Figure 2:
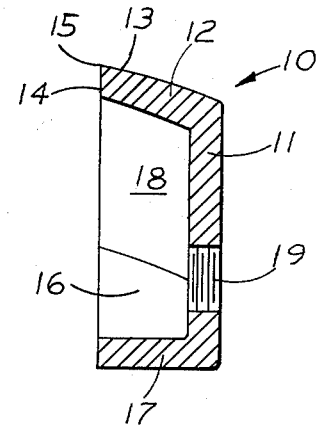
FIG. 2 is a cross-section of the cutter blade in FIG. 1 taken along the line I—I.

FIGS. 1 and 2 show views of a cutter blade 10 to demonstrate a typical embodiment of this invention. It may be inserted into a hob or milling cutter, as seen in FIG. 3. The cutter blade is formed of monolithic sintered powdered tool steel, that may be isostatically pressed before sintering to a density substantially 100% of the density of the same tool steel in wrought form. Such sintered tool steel typically has a density of at least 98% of the density of the same tool steel in wrought form. Similar materials are referred to as liquid phase sintered tool steels. Some tool steels that have been used for this purpose are M2, M3, M42, and T15. The sintered materials of the type described are more uniform in structure and equivalent or superior in properties to the same material in wrought form. An advantage of the sintered material lies in the smaller amount of material required to mold a sintered part to substantially finished shape than that required when the shape is cut or ground from bar or plate stock. This is true even before considering the additional reduction of material resulting from this invention.

As shown, the cutter blade 10 has a substantially flat base 11 and a wall 12 extending from one side of the base. The outside 13 of the wall 12 is ground to the desired contours of the cutting blade. The top of wall 12 is ground to produce a cutting face 14. The intersection of the cutting face and the contoured outside surface 13 of wall 12 creates a cutting edge 15. Abutments 16 interconnecting the wall 12 and base 11 supply additional support and rigidity to the wall, if needed. The abutments may also interconnect the wall with an optional rib 17 to form deep material saving recesses 18 and provide further rigidity. Such recesses should have a depth at least half of the thickness of the cutter blade in order to make a worthwhile saving of cutting material. The cutter blade in the embodiment shown has one or more threaded holes 19 through the base 11 for use in affixing the cutter blade in a hob, as later described. The cutter blade may be affixed in the hob in any of the well-known ways, so the threaded holes are not always necessary. When the cutter blades are clamped or wedged in place on the hob it may be desirable to make the cutting face 14 parallel to the base 11, or with the cutting face sloping toward or away from the base as the face approaches the rib 17. The main purpose of this construction is to save expensive metal cutting material. To that end the base, wall, abutments and ribs need only be of such dimensions as are required to provide adequate strength, rigidity and life for the intended use. The projection of the wall from the base may increase the life of the cutter without increasing the thickness of the base, the base being no thicker than necessary to provide the required strength to support the cutting edge when in use. The abutments and ribs may assist in supporting the wall, but their primary function is to increase the rigidity of the cutter. The resulting open, lightweight structure is distinguished from the prior art, in which the cutter has a solid, heavy structure of substantially uniform overall thickness, any departure therefrom providing functional features such as rake angle, chip guidance, or chip breaking.

As an example of how cutter blades 10 may be used, FIG. 3 shows a plurality of cutter blades spaced around the periphery of a hob, milling cutter, or similar rotating cutting tool, 20, rotatable in the direction indicated by the arrow. A core 21 has a bore 22 therethrough to accept a drive shaft. A keyway 23 is provided to receive a key for effecting a driving connection between the core and the shaft. Each of the blades 10 is restrained against radial movement as by a support 24 at a predetermined location on the core. Projections 25 from the core provide a back-up for the blades, while bolts 26, passing through the projections, are threaded into holes 19 in the blades to affix the blades to the core. The cutting edge 15 could extend radially (as shown) or axially from the core.

Figure 4:
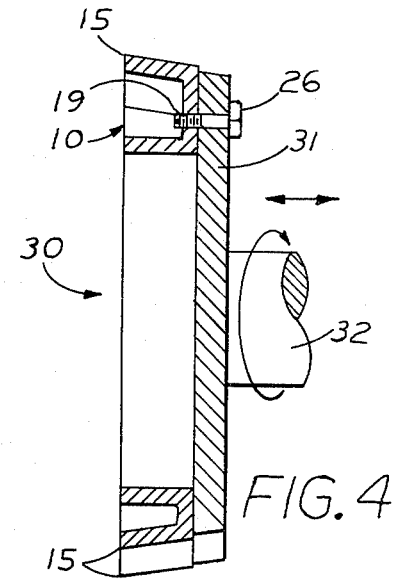
FIG. 4 is a cross-section of a shaper cutter incorporating blades as shown in FIGS. 1 and 2.

FIG. 4 shows an example of cutter blades 10 made in accordance with this invention mounted in a shaper cutter 30. As shown, a web 31 is mounted concentrically on a reciprocable and rotatable shaft 32. One or more blades 10 are affixed to the web as by bolts 26, passing through the web and threaded into holes 19. In a reciprocably cutting tool, such as the illustrated shaper cutter, such as a gear shaper cutter, the web 31 can under favorable conditions be integral with the cutter blade 10. With integral construction more ribs 17 may be employed to provide a honey-comb configuration between the walls 12. This is also true of any other large cutter made according to this invention. The invention may be similarly applied to other shaper cutters, having dies and other reciprocable tools.

For lathe tools the material saving is not worthwhile except in large tools. These tools would then have a lengthwise cross-section similar to that in FIG. 2, and would be sharpened by grinding the cutting face 14 rather than the outside surface 13 of wall 12. They would be mounted in the usual manner. Straight, as opposed to circular, form cutting tools would be made as shown in FIGS. 1 and 2. This invention is not applicable to circular form cutting tools. Because of the relatively small dimensions involved, the invention is not practical for application to ordinary saws.

While high density sintered powdered tool steel has been specified, other suitable materials, such as cemented carbides, investment castings and forged material could also be used.

The drawings and descriptions herein are exemplary only. They do not define the limits of the invention, which are specified in the claims. Those skilled in the art will recognize that many modifications and substitutions may be made without departing from the scope of this invention.

I claim:

1. A chip removing cutter blade for use in metal working comprising a monolithic body of molded metal cutting material with a plurality of deep material saving recesses molded therein, a substantially flat base, a wall extending from a side of said base, a plurality of spaced abutments interconnecting the wall and said base; said base, the wall and said plurality of abutments defining said plurality of deep material saving recesses; an outside of said wall ground to the desired cutting contour for said cutting blade, and the top of said wall ground to produce a cutting face, the intersection of said cutting face and the contoured outside of said wall creating a cutting edge.

2. A cutter blade according to claim 1 additionally comprising at least one rib, at least two of said plurality of abutments interconnecting the wall and said rib to define at least one of said plurality of recesses.

3. A cutter blade according to claim 1 wherein the outside of said wall is contoured in a series of repetitive shapes.

4. A cutter blade according to claim 3 wherein said repetitive shapes lie in a straight line for use in hobs and milling cutters.

5. A cutter blade according to claim 3 wherein said repetitive shapes lie in a circle for use in gear shaper cutters.

6. A cutter blade according to any of claims 1–3 wherein said recess has a depth at least half of the thickness of said cutter blade.

* * * * *